US011537500B2

(12) United States Patent
Grant

(10) Patent No.: US 11,537,500 B2
(45) Date of Patent: Dec. 27, 2022

(54) METHOD FOR PROVIDING ERROR DETECTION FOR A DISK DRIVE OF A SET TOP BOX

(71) Applicant: ARRIS Enterprises LLC, Suwanee, GA (US)

(72) Inventor: David Harold Grant, Doylestown, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 131 days.

(21) Appl. No.: 15/587,899

(22) Filed: May 5, 2017

(65) Prior Publication Data

US 2018/0322903 A1    Nov. 8, 2018

(51) Int. Cl.
  *G06F 11/34*  (2006.01)
  *G06F 11/30*  (2006.01)
  *G11B 20/10*  (2006.01)
  *G11B 20/18*  (2006.01)

(52) U.S. Cl.
  CPC ...... *G06F 11/3495* (2013.01); *G06F 11/3034* (2013.01); *G06F 11/3409* (2013.01); *G06F 11/3485* (2013.01); *G11B 20/10305* (2013.01); *G06F 2201/88* (2013.01); *G11B 2020/1869* (2013.01)

(58) Field of Classification Search
  CPC ............. G06F 11/3495; G06F 11/3034; G06F 11/3409; G11B 20/10305; G11B 2020/1869
  See application file for complete search history.

(56) References Cited

U.S. PATENT DOCUMENTS

| 8,838,882 B1* | 9/2014 | Quong ................ G06F 12/0802 711/167 |
| 2002/0118307 A1* | 8/2002 | Lee ........................ G06F 12/023 348/714 |
| 2003/0149918 A1* | 8/2003 | Takaichi ................ G11B 20/18 714/42 |
| 2008/0104259 A1* | 5/2008 | LeFevre .............. H04L 67/1097 709/228 |
| 2016/0105715 A1* | 4/2016 | Panje .................. H04N 21/4425 725/14 |
| 2018/0314440 A1* | 11/2018 | Abe ...................... G06F 3/0616 |

* cited by examiner

*Primary Examiner* — April Y Blair
*Assistant Examiner* — Rong Tang
(74) *Attorney, Agent, or Firm* — Panitch Schwarze Belisario & Nadel LLC

(57) ABSTRACT

Various implementations described herein are directed to technologies for providing error detection for a disk drive of a digital video recorder (DVR). Access data is measured according to a degree of usage of a disk drive of a DVR. The access data is stored. The stored access data is analyzed to detect performance degradation of the disk drive.

13 Claims, 4 Drawing Sheets

305 — Measure access data according to a degree of usage of a disk drive

310 — Store the measured access data

315 — Interpret the stored access data to detect performance degradation of the disk drive

300

METHOD FOR PROVIDING ERROR DETECTION FOR A DISK DRIVE OF A SET TOP BOX

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Audio/video content is stored in digitized format on an integrated hard drive in a digital video recorder (DVR) system. Advanced DVRs are capable of recording and playing back multiple concurrent sessions. Playback is targeted to televisions directly, or indirectly, through client set top boxes. The hard drive may be subjected to rigorous conditions, which vary with the number of record and playback sessions.

The onboard Self-test, Monitoring, Analysis and Reporting Technology (SMART) diagnostics suite of a hard disk drive is not calibrated by the drive manufacturer to detect what would be considered marginal performance for an extreme application such as a DVR. Marginal or lesser performance of the hard drive can result in delayed disk accesses, corrupted recordings and poor playback experiences.

Heavy use of a DVR results in continuous hard drive stress, with active gyrations back and forth across large platter surface areas of the hard drive as concurrent recordings and/or playbacks access multiple files simultaneously. Over time, the precision with which heads of the disk drive slide, i.e., mechanical slop of the heads during accesses, may become more apparent with increases in access times.

Additionally, contaminants may settle on the platters and result in retries or failures with difficult reads and writes. With an aging system, it is imperative that any trending hard drive problems be detected early to anticipate and minimize loss of content.

SUMMARY

Described herein are implementations of various technologies of a method for providing error detection for a disk drive of a DVR. Access data is measured according to a degree of usage of a disk drive of a DVR. The access data. The stored access data is analyzed to detect performance degradation of the disk drive.

An access module of the DVR sets a timer that allows a data access request received by the access module to terminate after a predetermined threshold. The timer may include an access timeout counter. Upon completion of the data access request, the access data may be acquired by an error detection module of the DVR.

The access data can include an amount of time to complete a data access operation.

An amount of access data acquired can be configured to be proportional to a density of read and/or write accesses of the disk drive. The access data may be acquired for each read and/or write access. The access data may be configured to be acquired according to a certain frequency. The access data may be configured to be acquired after a certain number of data accesses. The access data may be configured to be acquired on one or more days. The access data may be configured to be acquired according to one or more times of day.

The stored access data may include a time stamp. The time of collection of the access data can be useful in analyzing the acquired data.

The access data can be saved in bins to optimize storage. The bins may represent a range or category of timing durations. A histogram can be derived from the bins in order to provide further statistical analysis of the data. The bins can be periodically evaluated to detect performance degradation of the disk drive.

Detecting performance degradation of the disk drive may include comparing actual runtime profiles of the disk drive with a normal profile of the disk drive. The actual runtime profiles can be periodically compared with the normal profile.

Also described herein are implementations of various technologies of a device for providing error detection for a disk drive. The device includes a DVR. The DVR may be configured to: measure access data according to a degree of usage of a disk drive of the DVR; store the measured access data; and analyze the stored access data to detect performance degradation of the disk drive.

Further described herein are implementations of various technologies of a non-transitory computer-readable medium having stored thereon a plurality of computer-executable instructions which, when executed by a computer, cause the computer to: measure access data according to a degree of usage of a disk drive of a DVR; store the measured access data; and analyze the stored access data to detect performance degradation of the disk drive.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

One or more implementations of various techniques for providing error detection for a disk drive of a set top box will now be described in more detail with reference to FIGS. 1-4 in the following paragraphs.

The present disclosure provides monitoring of drive performance that is proportional to hard drive utilization. A lightly used system will not force a problem by stress testing a drive beyond its normal usage boundaries in the existing environment. Likewise, a heavily used system will be monitored precisely under the heavy conditions to which it is subjected. Based on the principles of the present disclosure, testing is naturally calibrated to actual use, and does not needlessly cause alarm for conditions not experienced.

In certain instances, when either a disk read or a disk write is made, an error detection associated with an access timeout operation is implemented. The set top box monitors the disk drive to unobtrusively detect trends, e.g., increases in disk drive access times. By monitoring the disk drive access times, the set top box can detect one or more trends indicating a potential for disk drive failure.

Figure 1:
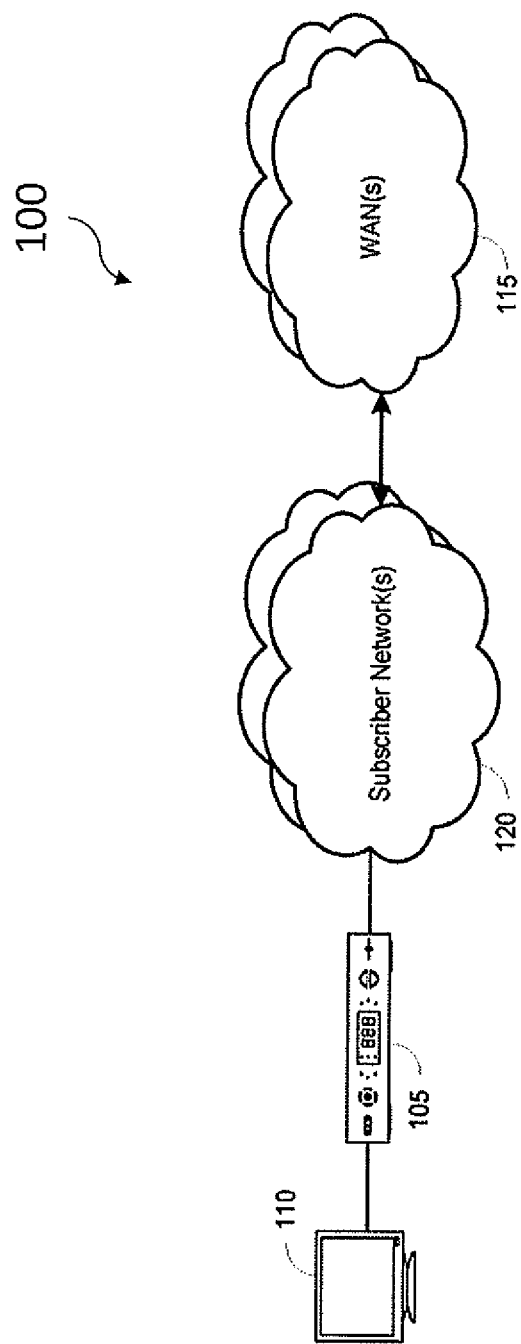
FIG. 1 illustrates an example network environment in accordance with implementations of various techniques described herein.

FIG. 1 is a block diagram illustrating an example network environment 100 for providing error detection for a disk drive of a set top box. In some implementations, video, voice, and/or data services may be delivered to one or more client devices via one or more customer premise equipment (CPE) devices installed within a subscriber premise. For example, multiple services may be provided by a set-top box (STB) 105 and may be received by a user through a display device (e.g., television 110). It should be understood that a user may receive multiple services through other display devices such as a mobile device, tablet, computer, gaming console, and others. The various data, multimedia, and/or voice services provided by the STB 105 may include, but is not limited to, live or broadcast television, video-on-demand (VoD) content, pay-per view content, recorded content (e.g., DVR content), audio-only content, streaming content, and others. A set-top box (STB) may receive content from multiple different networks and/or service providers and store this content in a memory. In one implementation, STB 105 may act as a digital media server in a DLNA-based network. In one implementation, STB 105 can be a digital video recorder (DVR) or any other multimedia device capable of providing DVR-like functionality.

Multiple services may be delivered to CPE devices over one or more local networks. For example, a local network may be provided by a gateway device, and the multiple services may be delivered to one or more CPE devices by the gateway device. Local network(s) may include a coaxial network, a local area network (LAN), wireless local area network (WLAN), personal area network (PAN), Multimedia over Coax Alliance (MoCA) network, mobile hotspot network, and others. It should be understood that the STB 105 may receive services from and may output upstream communications to an access point (e.g., gateway device, modem, router, wireless extender, etc.) over a wired or wireless connection to the access point.

Multiple services may be delivered to a subscriber premise from a wide-area network (WAN) 115 through a subscriber network 120. The subscriber network 120 may include, for example, a hybrid fiber-coaxial (HFC) network, fiber network, mobile network, satellite network, and any other network operable to deliver services to a subscriber premise.

Multimedia content may be received at the STB 105 as a content stream. For example, the content may be delivered to the STB 105 as a stream of packets or frames, and the packets or frames may be decoded and processed for presentation to a user through a connected display device (e.g., television 110).

The STB 105 may be configured to receive content from a plurality of content or service providers. For example, the STB 105 may receive content from a plurality of different subscriber networks 120 (e.g., a head end of a cable network, satellite network, etc.) and/or WANs 115. Content streams received from different service providers may be received at the STB 105 in different formats.

Figure 2:
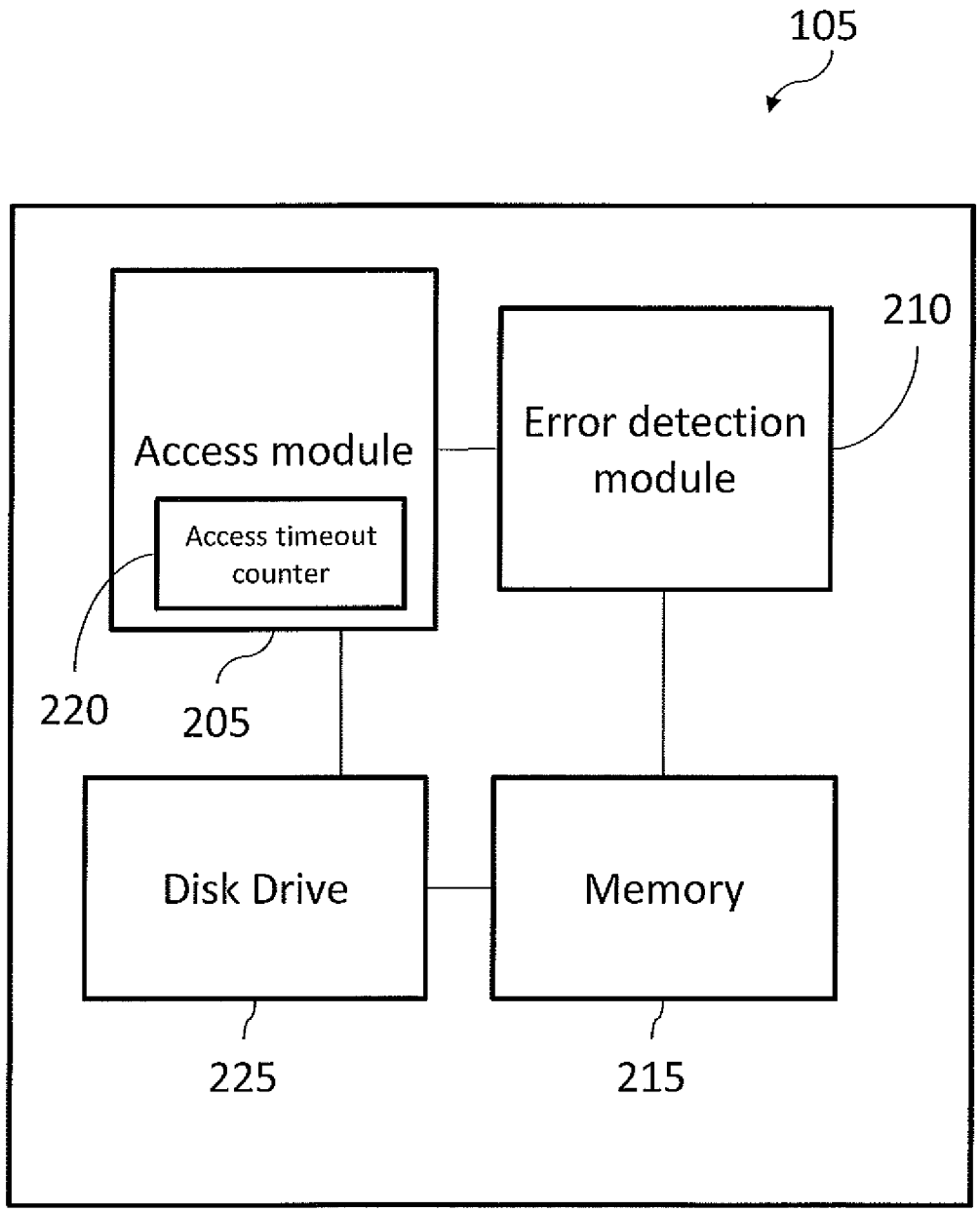
FIG. 2 illustrates an example set top box in accordance with implementations of various techniques described herein.

FIG. 2 is a block diagram illustrating an example set-top box (STB) 105 operable to provide error detection for a disk drive of the set top box in accordance with various implementations described herein. Included within the STB is an access module 205, an error detection module 210, a disk drive 225 and a memory 215. Access module 205 also includes access timeout counter 220.

Access module 205 runs on the STB 105. In one implementation, access module 205 has an associated access time out counter 220 for data access requests sent to the disk drive 225. This time out counter ensures that the system, e.g., the application from the STB accessing the disk drive 225, does not wait indefinitely for a data access to terminate. The access module 205, sets a timer, e.g., access timeout counter 220. This timer 220 allows a data access request to terminate after a predetermined time threshold. The data access operation terminates or completes when a timeout occurs or when the access module receives an acknowledgement from disk drive 225 of a successful read and/or write operation.

Upon completion of the access timeout counter operation, access data is acquired by the error detection module. The access data is stored in a memory 215, 420 of the STB. In one implementation, when the access data is collected, a time stamp may be included with the data. The inclusion of the time stamp with the collected access data provides one way to determine when the data was collected. The time at which the access data is collected can be stored along with the error correction data.

Error detection module 210 can interpret the stored data to determine trends with respect to access time data of the disk drive 225. Error detection module 210 provides ongoing background statistical data collection of read and write access times. Normal profiles of access times are compared to actual runtime profiles and trends. Based on the comparison of the actual runtime profiles and normal profiles, the set top box indicates that performance degradation has been detected. Based upon this indication, the set top box sets a flag that indicates the need for remedial action.

Before an alarm is triggered, the error detection module of the STB analyzes the access data and/or statistical data to determine whether the performance of the disk drive 225 is changing from what is understood to be the normal behavior, e.g., steady state operation, of the disk drive 225. The actual performance of the disk drive 225 can either be compared to a standard or to normal operating characteristics of the disk drive 225 itself in order to determine if the disk drive 225 is failing or degrading. An example of degrading performance can be a determination that the same operation is trending to longer durations of time.

Figure 3:
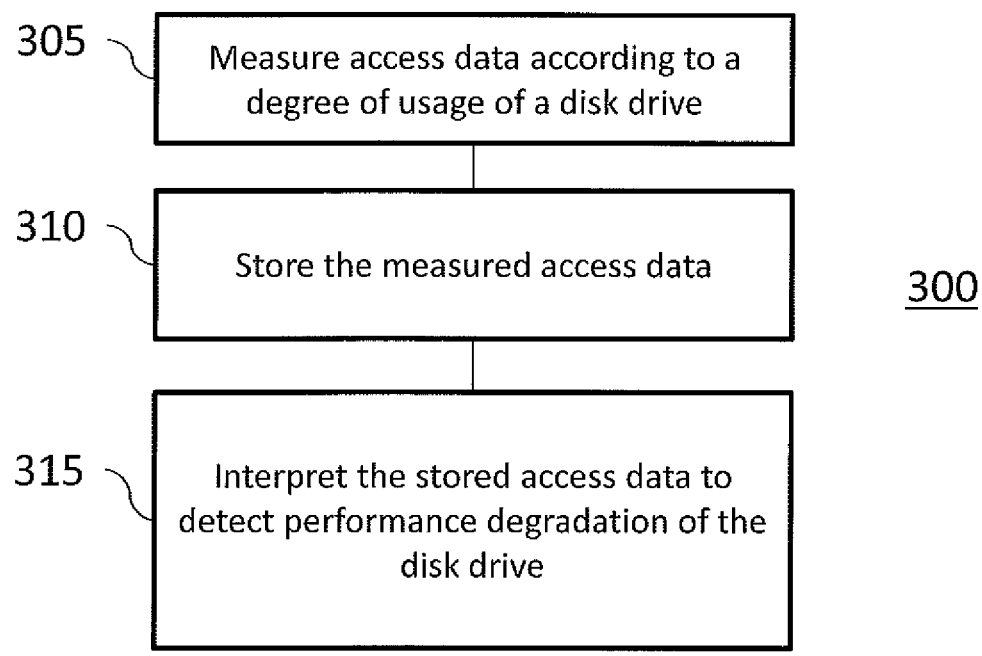
FIG. 3 illustrates a flow diagram of a method for providing error detection for a disk drive of the set top box in accordance with implementations of various techniques described herein.

FIG. 3 illustrates a diagram of a method 300 for detecting errors in a disk drive, e.g., disk drive 225, of a STB in accordance with implementations of various techniques described herein. At block 305, error detection is provided according to a degree of usage of a disk drive. The set top box provides background analysis of disk drive performance based on continuous measurement of disk drive read and write access times. The density of read/write accesses is directly indicative of the system's utilization of the hard drive. In one implementation, access data is acquired for every access. In another implementation, the amount of access data acquired can be configured to be proportional to the number of read and/or write accesses of the disk drive.

An access module running on the STB has an associated time out counter for data access requests sent to the disk drive. This time out counter ensures that the system, e.g., the application from the STB accessing the disk drive, does not wait indefinitely for a data access to terminate. The access module, e.g., access module 205, sets a timer, e.g., access timeout counter 220, that allows a data access request to terminate after a predetermined time threshold.

The time-out monitoring via access timeout counter 220 is built into the access module 205 as a fail-safe. The present application provides an additional call from the time out monitoring code. When the data access operation completes, e.g., when a timeout occurs or when the access module receives some acknowledgement from the disk drive of a successful read and/or write operation, the access timeout counter 220 operation terminates. Upon completion of the access timeout counter operation, access data is acquired by the error detection module. The access data may be provided to the error detection module, e.g., pulled from the access module 205 by the error detection module 210, by employing a call from the error detection module to the access module. This access data may be a timing value or an amount of time to complete a data access operation. This timing value or amount of time can be provided by determining the amount of time that elapsed for a particular data access request from the access timeout counter 220 of the access module 205.

In one implementation, access data is pulled from the access module for each read and/or write access. In another implementation, the STB can be configured to pull access data according to a certain frequency, e.g., after a certain number of data accesses, according to one or more certain days, and/or according to one or more times of day.

In one implementation, when the access data is collected, a time stamp may be included with the data. The inclusion of the time stamp with the collected access data provides one way to determine when the data was collected. The time that the access data is collected can be stored along with the error correction data that is stored as described below with respect to block 310. In addition, the time of collection of the error correction data may also be useful when the error correction data is interpreted as described below with respect to block 315.

At block 310, access data, e.g., data associated with the error detection, is stored. This data may be stored in a memory location of the STB, e.g., memory 215, 420.

In one implementation and with minimal overhead, this timing data, typically without timeouts having occurred, can be saved. Counts of occurrences of this timing data can be saved in bins to optimize storage, with each bin representing a range or category of timing durations. For example, timing data can be stored in bins according to timing data falling within 0 to 2, 2 to 4, 4 to 6 and/or 6 or more microseconds. The timing data duration for each bin can be on the order of microseconds, nanoseconds or any other unit of time representative of typical or normal read and/or write operations.

The utilization of bins optimizes data storage. Bins are defined as a set of ranges of access duration. Each bin represents an access duration range and has an associated single large value integer counter. The counter is incremented whenever an access is added to the bin. Each counter is large enough to count all data accesses over the lifetime of the hard drive.

Snapshots of the set of bin counters can be captured and archived with a time stamp on a periodic and optimal basis (hourly, daily, etc). Each snapshot is a histogram showing the cumulative history of the drive's distribution of access times up to that instant in time. The archive of the list of snapshots can be saved and referenced to determine changes (trends) in access time distribution.

Storing time stamps with every binned value would rapidly deplete available archiving space in the STB. Using the counter described above, the bins are configured as a set of counters of fixed size. The total access distribution of the drive can be stored in a few hundred bytes. Each snapshot can be a full set of bins plus a time stamp, and an optimal granularity of how many (how frequently) these snapshots are collected and stored can be configured using the error detection module 210.

In one implementation, a bin array can be utilized. A bin array is an array of bin counters, where each counter represents the number of instances, within the range of access duration defined for that bin. Two bin arrays can be defined individually for read and write accesses (a read bin array and a write bin array).

Within the context of a bin array, a snapshot is a structure consisting of a time stamp and a copy of the bin array(s) at a given point in time. Snapshots can be saved periodically, e.g., every hour, once a day, once a week, etc. In one implementation, non-volatile memory (NVMem), if available in the system, can be used for archiving. In another implementation, periodic uploading to a host system can be used for archiving.

The bin arrays can be either cumulative or, if snapshots are retained on a daily basis, the bin array counters can be reset after being saved. Whether cumulative or reset, similar analysis on the historical data can be performed, with the trade-offs that reset arrays can have smaller counters and cumulative arrays can, in some cases, be faster to process.

In one implementation a histogram can be derived from the binned data. Based on the derived histogram further analysis/evaluation of the data can be accomplished.

At block 315, the stored data is analyzed to detect performance degradation of the disk drive. The set top box provides ongoing background statistical data collection of read and write access times. Normal profiles of access times are compared to actual runtime profiles and trends. Based on the comparison of the actual runtime profiles and normal profiles, the set top box indicates that performance degradation has been detected. Based upon this indication, the set top box sets a flag that indicates the need for remedial action.

In one implementation, normal profiles of access times are periodically compared to the actual runtime profiles.

In another implementation, data from one or more bins is periodically evaluated. The set top box provides periodic automatic analysis of this statistical data to reveal one or more failure trends. The STB periodically evaluates the data in the bins to determine if the system is trending toward longer read/write access times, in which case alarms can be published/triggered indicating disk degradation and/or an impending disk drive failure.

The implementations described in the present disclosure provide certain advantages. Unlike prior solutions, this solution does not depend on SMART tests. SMART tests are integrated in the hard drive firmware by hard drive manufacturers. SMART tests are typically not stringent enough for DVR applications. Unlike other performance tests which are executed on demand, this solution runs whenever the disk drive is active and operates in the background with minimal overhead.

Another advantage provided by the present disclosure is that the error detection testing is adaptable to the amount of stress that the disk drive is undertaking in that environment. In such an adaptable system rigorous test of a hard drive in an environment where the DVR isn't being used often can be avoided. In other words, the present disclosure provides error detection that can avoid testing for problems that occur in higher stress environments in DVRs that are used in low stress environments. In cases where the DVR is subjected to higher stress activities, e.g., multiple recordings at the same time as playbacks, testing can be performed more often. This testing tailors itself to the environment so that if there are problems occurring due to the way one person uses their DVR, these problems can be detected and addressed.

Figure 4:
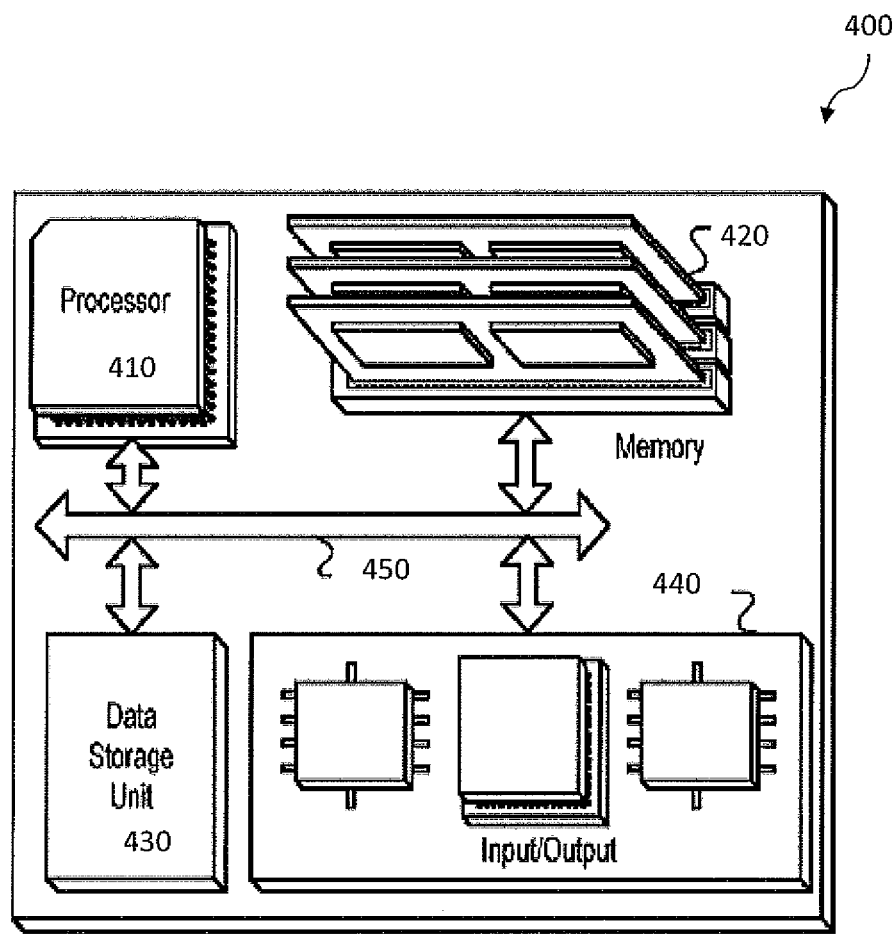
FIG. 4 illustrates a schematic diagram of a computing system in which the various technologies described herein may be incorporated and practiced.

FIG. 4 is a block diagram of a hardware configuration 400 operable to provide error detection for a disk drive of the set top box. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device/drive, an optical disk device, flash memory or some other large capacity storage device. In other implementations, the storage device 430 can be a device external to the hardware configuration 400.

The input/output device 440 provides input/output operations for the hardware configuration 400. In one implementation, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video, voice, and/or data services to a display device (e.g., television 110 of FIG. 1, mobile device, tablet, computer, etc.). In embodiments, the input/output device can include driver devices configured to send communications to, and receive communications from one or more networks (e.g., local network, subscriber network 120 of FIG. 1, WAN 115 of FIG. 1, etc.).

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
receiving, by an access module of a digital video recorder (DVR), at least one of a read data access request and a write data access request for a disk drive in the DVR;
periodically measuring, based on the at least one of a read and write data access request, a time for each read and write access to data in a memory of the disk drive in the digital video recorder (DVR), wherein a frequency that the access module periodically measures time for each read and write access to data in the memory is set according to a degree of usage of the disk drive in the digital video recorder (DVR);
storing the measured time for each read and write access to data in the memory, wherein the memory includes a plurality of different bins, each bin representing a different range of timing durations, and wherein storing includes storing the measured time for each read and write access to data in a respective bin, of the plurality of different bins, that encompasses the measured time; and
comparing the stored measured time for each read and write access to data in the memory with the measured time a read and write access to data in the memory of the disk drive in the past to detect performance degradation of the disk drive.

2. The method of claim 1, wherein an access module of the DVR sets a timer that allows a data access request received by the access module to terminate after a predetermined threshold.

3. The method of claim 2, wherein the timer comprises an access timeout counter.

4. The method of claim 2, wherein, upon completion of the data access request, the accessed data is acquired by an error detection module of the DVR.

5. The method of claim 1, wherein the time for each read and write access to data comprises an amount of time for the memory to provide a response signal.

6. The method of claim 1, wherein an amount of data acquired during the time for each read and/or write access to data is configured to be proportional to a density of read and write time accesses of the disk drive.

7. The method of claim 6, wherein the accessed data is acquired for each read and write access.

8. The method of claim 6, wherein the accessed data is configured to be acquired after a certain number of data accesses.

9. The method of claim 1, wherein the stored access data includes a time stamp.

10. The method of claim 1, wherein a histogram is derived from the plurality of bins.

11. The method of claim 1, wherein the plurality of bins are periodically evaluated to detect performance degradation of the disk drive.

12. A digital video recorder (DVR) comprising:
a disk drive memory;
a processor; and
a data storage memory storing code to configure the processor to:
  receive, by an access module of the digital video recorder (DVR), at least one of a read data access request and a write data access request to a disk drive of the digital video recorder (DVR);
  periodically measure a time for each read and write access to data in the disk drive memory in the digital video recorder (DVR), wherein a frequency that the access module periodically measures time for each read or write access to data in the disk drive memory is set according to a degree of usage of the disk drive in the digital video recorder (DVR);
  store the measured time for each read and write access to data in the disk drive memory, wherein the disk drive memory includes a plurality of different bins, each bin representing a different range of timing durations, and wherein the processor stores the measured time for each read and write access to data in a respective bin, of the plurality of bins, that encompasses the measured time; and
  compare the stored measured time for each read and write access to data in the disk drive memory with the measured time to access data in the disk drive memory in the past to detect performance degradation of the disk drive.

13. A non-transient computer readable medium containing program instructions for causing a computer to perform the method of:
  receiving, by an access module of a digital video recorder (DVR), at least one of a read data access request and a write data access request to a disk drive of the digital video recorder (DVR);
  periodically measuring a time for each read and write access to data in a memory of a disk drive in the digital video recorder (DVR), wherein a frequency that the access module periodically measures time for each read and write access to data in the memory is set according to a degree of usage of the disk drive in the digital video recorder (DVR);
  storing the measured time for each read and write access to data in the memory, wherein the memory includes a plurality of different bins, each bin representing a different range of timing durations, and wherein storing includes storing the measured time for each read and write access to data in a respective bin, of the plurality of different bins, that encompasses the measured time; and
  comparing the stored measured time for each read and write access to data in the memory with the measured time for each read and write access of access data in the memory of the disk drive in the past to detect performance degradation of the disk drive.

* * * * *